United States Patent
Lepiorz et al.

(10) Patent No.: US 11,664,548 B2
(45) Date of Patent: May 30, 2023

(54) POUCH CELL AND STACK

(71) Applicant: Hilti Aktiengesellschaft, Schaan (LI)

(72) Inventors: Matthias Lepiorz, Chemnitz (DE); Nora Martiny, Herrsching-Breitbrunn (DE); Bernd Ziegler, Schwabmuenchen (DE); Robert Stanger, Kaufbeuren (DE); Kathrin Sax, Scheuring (DE); Moses Ender, Buchs (CH); Klaus Hauser, Schwabmuenchen (DE)

(73) Assignee: Hilti Aktiengesellschaft, Schaan (LI)

(*) Notice: Subject to any disclaimer, the term of this patent is extended or adjusted under 35 U.S.C. 154(b) by 177 days.

(21) Appl. No.: 17/056,890

(22) PCT Filed: Jun. 26, 2019

(86) PCT No.: PCT/EP2019/066987
§ 371 (c)(1),
(2) Date: Nov. 19, 2020

(87) PCT Pub. No.: WO2020/007679
PCT Pub. Date: Jan. 9, 2020

(65) Prior Publication Data
US 2021/0210825 A1 Jul. 8, 2021

(30) Foreign Application Priority Data
Jul. 4, 2018 (EP) .................................. 18181724

(51) Int. Cl.
*H01M 50/105* (2021.01)
*H01M 50/555* (2021.01)
(Continued)

(52) U.S. Cl.
CPC ....... *H01M 50/105* (2021.01); *H01M 50/503* (2021.01); *H01M 50/517* (2021.01);
(Continued)

(58) Field of Classification Search
CPC ............. H01M 50/555; H01M 50/105; H01M 50/503; H01M 50/557
See application file for complete search history.

(56) References Cited

U.S. PATENT DOCUMENTS

| 10,811,744 B2 | 10/2020 | Sauerteig et al. |
| 2017/0018746 A1 | 1/2017 | Kritzer et al. |
| 2018/0026294 A1 | 1/2018 | Sauerteig et al. |

FOREIGN PATENT DOCUMENTS

| CN | 205211862 U | 5/2016 |
| CN | 106384795 A | 2/2017 |

(Continued)

OTHER PUBLICATIONS

International Search Report of PCT/EP2019/066987, dated Sep. 2, 2019.

*Primary Examiner* — Jane J Rhee
(74) *Attorney, Agent, or Firm* — Davidson, Davidson & Kappel, LLC

(57) ABSTRACT

Pouch cell having a positive contact region and a negative contact region, by which contact regions electrical contact can be made with the pouch cell and the pouch cell can be charged and discharged in this way, wherein the pouch cell is of planar design and has a cell top side as well as a cell bottom side which is situated opposite the cell top side, wherein the positive contact region is located exclusively on the cell top side and the negative contact region is located exclusively on the cell bottom side, or vice versa.

20 Claims, 8 Drawing Sheets

(51) Int. Cl.
*H01M 50/503* (2021.01)
*H01M 50/548* (2021.01)
*H01M 50/566* (2021.01)
*H01M 50/517* (2021.01)

(52) U.S. Cl.
CPC ....... *H01M 50/548* (2021.01); *H01M 50/555* (2021.01); *H01M 50/566* (2021.01)

(56) References Cited

FOREIGN PATENT DOCUMENTS

| | | |
|---|---|---|
| CN | 107634169 A | 1/2018 |
| DE | 102015000735 A1 | 7/2016 |
| KR | 20100128927 A | 12/2010 |
| WO | WO2007028803 | 3/2007 |
| WO | WO 2007028803 A1 | 3/2007 |

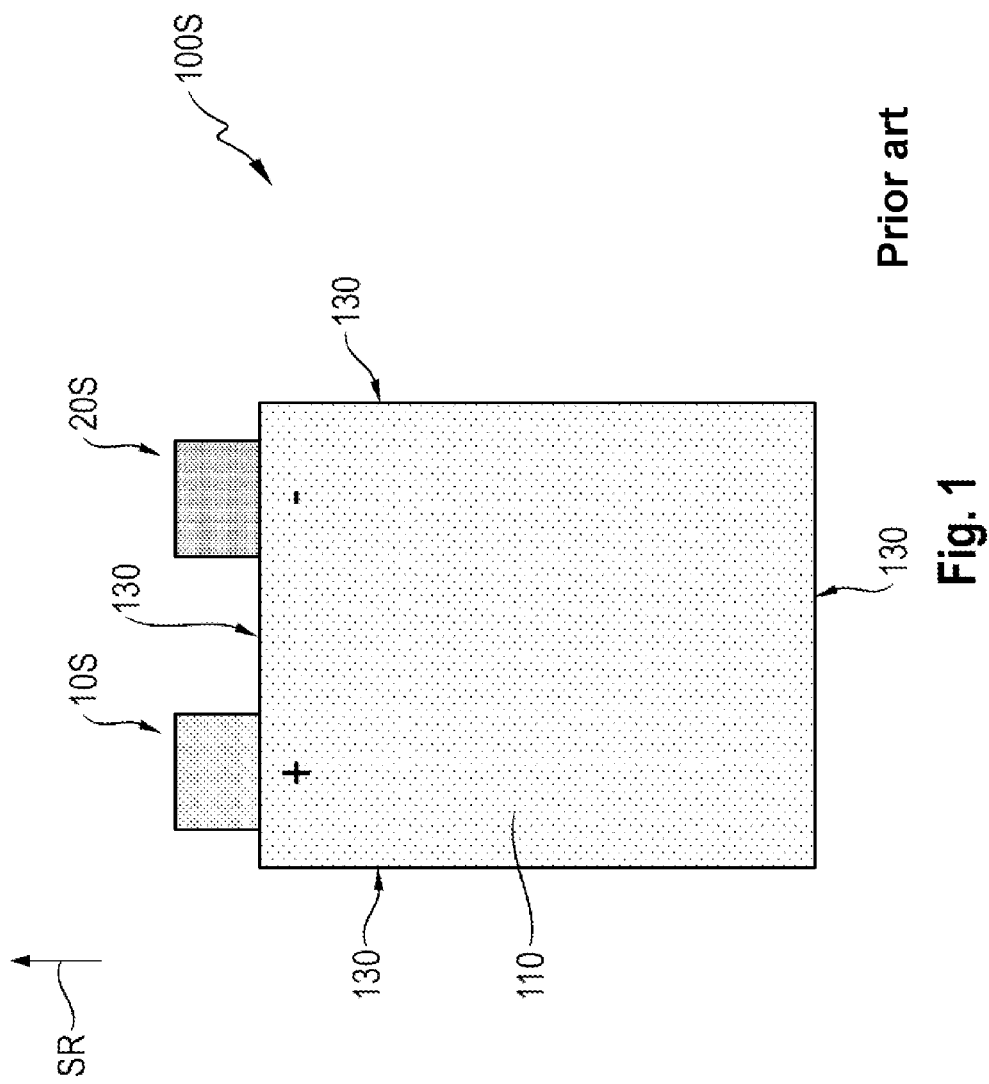

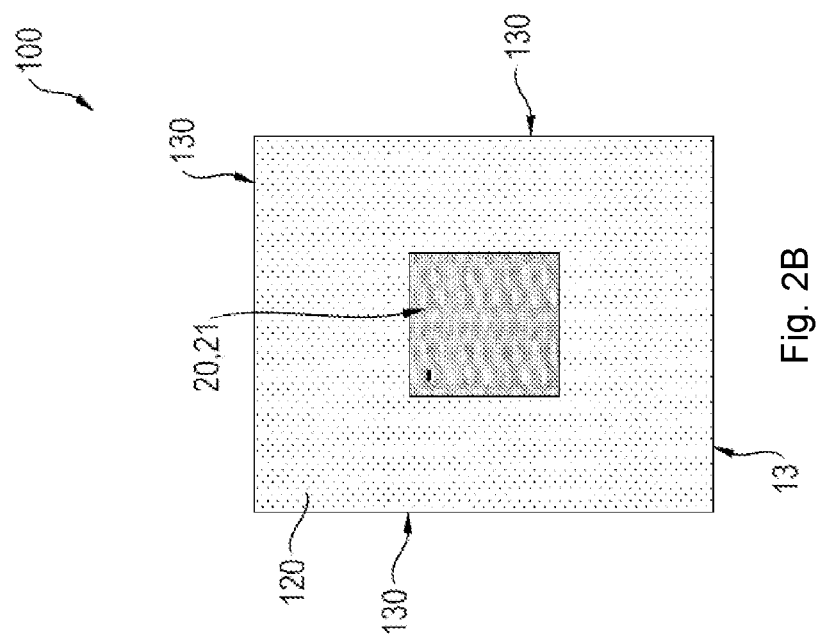
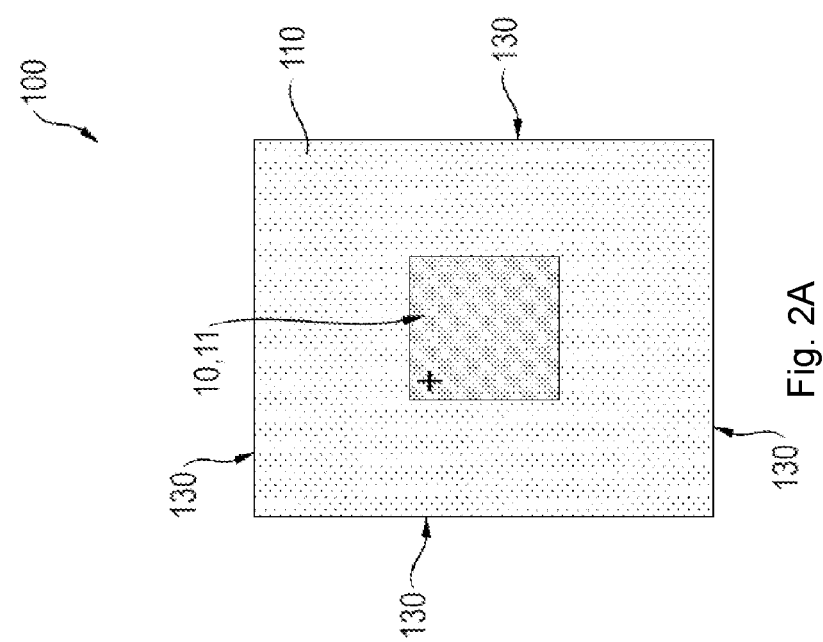

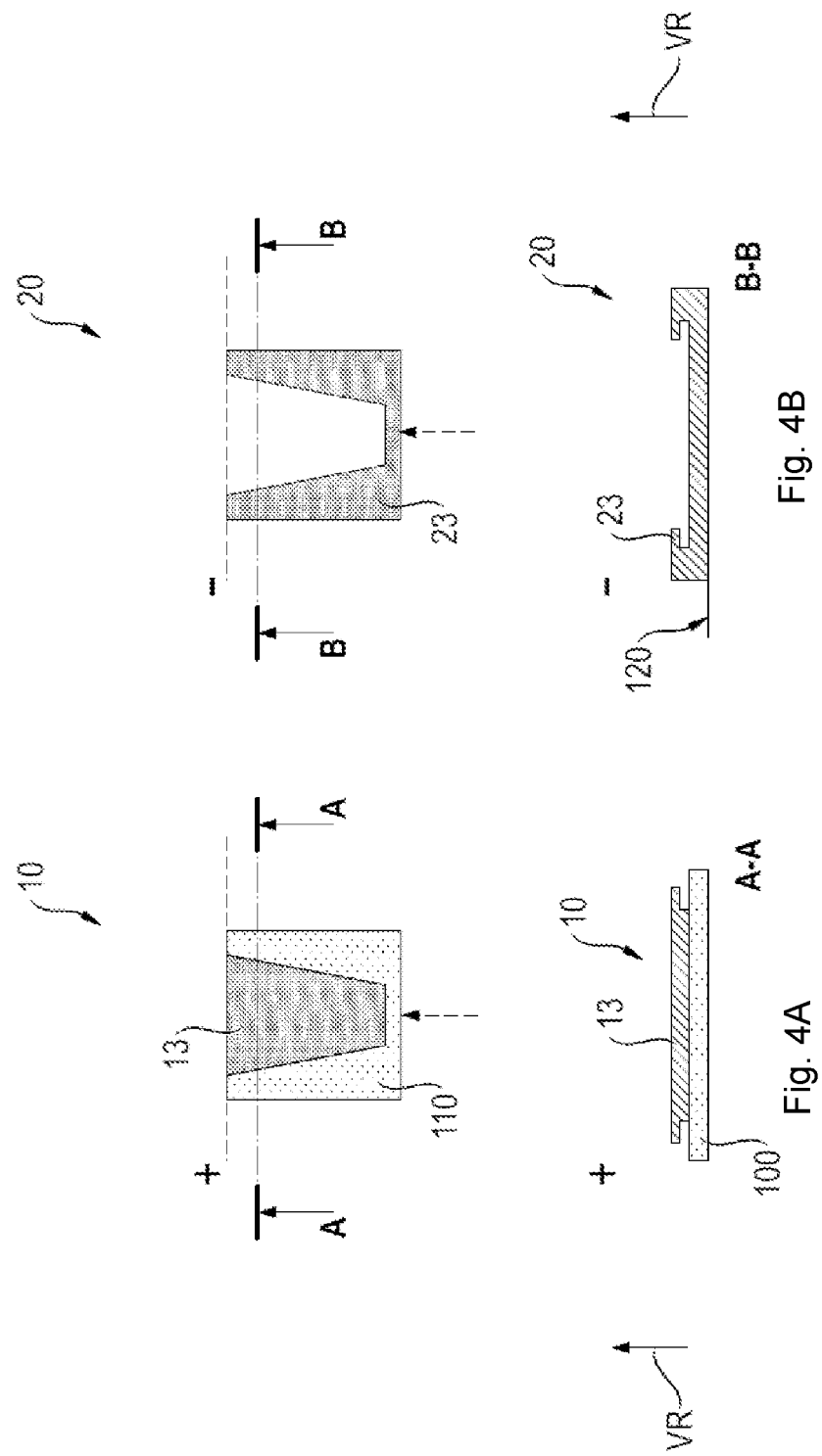

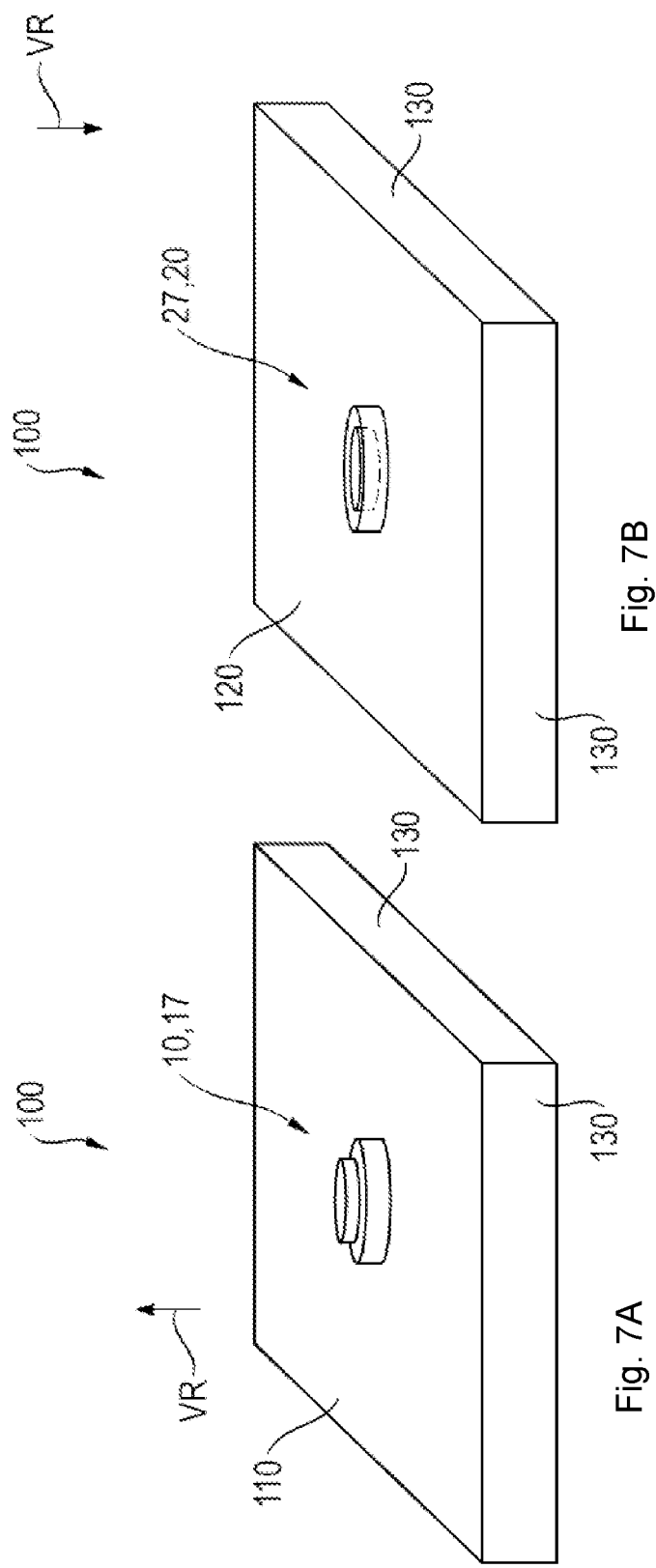

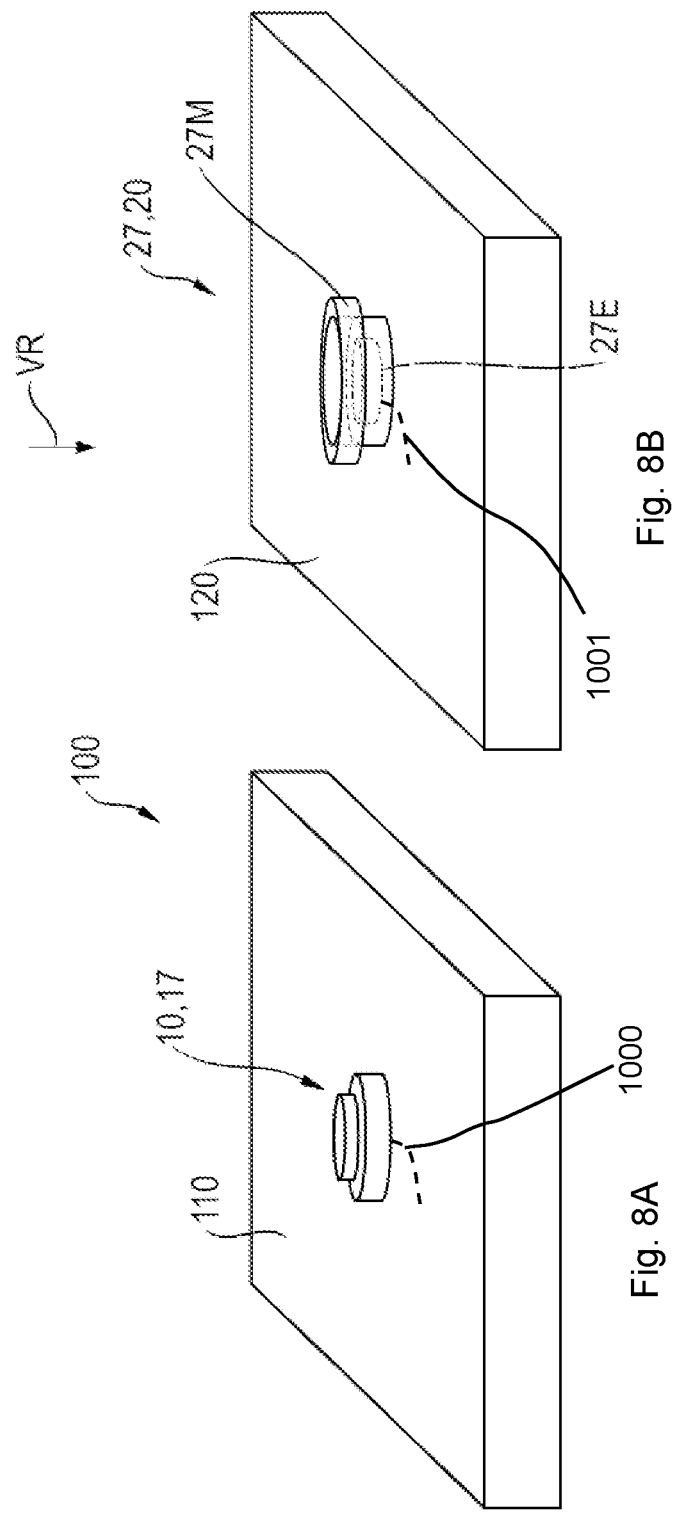

POUCH CELL AND STACK

The present invention relates to a pouch cell having a positive contact region and a negative contact region, by means of which contact regions electrical contact can be made with the pouch cell and said pouch cell can be charged and discharged in this way. The pouch cell is of planar design and has a cell top side as well as a cell bottom side which is situated opposite the cell top side. The pouch cell preferably has a rechargeable lithium-ion battery.

Pouch cells of the kind mentioned at the outset are known in principle from the prior art.

SUMMARY OF THE INVENTION

It is an object of the present invention to provide a pouch cell which fosters simple and reliable contact-connection.

The present invention provides that the positive contact region is located exclusively on the cell top side and the negative contact region is located exclusively on the cell bottom side, or vice versa. The pouch cell preferably has an encircling cell edge strip or edge region which is free of electrical contact lugs or free of any kind of electrical contact-making elements.

The invention includes the finding that pouch cells of the prior art are difficult to handle in mass production processes since their contact lugs are typically situated close to one another and the pouch cells can be short-circuited if they are not handled carefully. Furthermore, it was found that, on account of their construction, pouch cells previously could not be resistance-welded for the purpose of making electrical contact. In mass production processes of rechargeable battery packs or stacks comprising pouch cells, this leads to a high level of technical and financial expenditure for automated installations which carry out electrical contact-connection of the individual pouch cells. The stack can also be called a pack, batch or pile.

In contrast to this, a pouch cell is created, the positive contact region of which pouch cell is located exclusively on the cell top side and the negative contact region of which pouch cell is located exclusively on the cell bottom side, or vice versa. As a result, the pouch cell according to the invention can advantageously be safely handled in a mass production process, that is to say any short circuits between pouch cells of a stack can be avoided.

On the basis of the pouch cell which is provided according to the invention, a stack comprising a plurality of pouch cells can be provided. A stack of this kind may be part of a rechargeable battery pack for supplying power to an electrical handheld power tool. Accordingly, the invention also provides for the use of a stack comprising a plurality of pouch cells according to the invention for supplying power to an electrical handheld power tool.

In this respect, the invention includes the finding that rechargeable battery packs for electrical handheld power tools are typically manufactured exclusively from cylindrical lithium-ion cells. However, as the power requirement of handheld power tools increases, the discharge currents required increase, as a result of which the battery packs, on account of higher power losses, reach the maximum permissible level before discharge and have to be switched off for temperature-related reasons. The residual energy remaining in the battery pack is not available to users—or is available only after a cooling-down phase.

A stack having a plurality of pouch cells which are contact-connected according to the invention can reduce temperature-related switching off of battery packs for electrical handheld power tools. This is because pouch cells can now be used instead of conventional cylindrical lithium-ion cells. It was found that, on account of their internal electrical design, pouch cells have a lower electrical resistance and therefore exhibit less power loss given comparatively high discharge capacities, as a result of which battery packs comprising pouch cells of this kind can be operated either for longer or at higher powers.

In a particularly preferred refinement, the positive contact region is designed as an electrical/mechanical positive connection element and/or the negative contact region is designed as an electrical/mechanical negative connection element. The positive connection element and/or the negative connection element can each be of flat design and designed for contact-connection by means of pressing or welding. A stack comprising a plurality of pouch cells can accordingly be provided by way of the contact regions, which are preferably of planar design, of adjacent pouch cells bearing against one another. By pressing the individual pouch cells in a rechargeable battery pack housing onto one another, contact-connection of the individual cells can be ensured. Pressing the individual cells onto one another in this way preferably produces a reversible connection between the respective contact regions of the layered pouch cells. In an alternative exemplary embodiment, the layered pouch cells can also be connected to one another in an irreversible manner. This can be done, for example, by way of a conductive coating, which then forms a respective contact region, being applied before the pouch cells are pressed onto one another, wherein the conductive coating has an adhesive or sticking effect. In a further refinement, a connection element can be formed, for example, by a weldable and conductive plastic, wherein welding can be performed, for example, by means of thermal or ultrasonic welding.

In a further preferred refinement, the positive connection element and/or the negative connection element are each designed as a plug-in connection element. The positive connection element and the negative connection element are preferably configured as complementary plug-in connection elements. Therefore, for example, the positive connection element can be designed as a male plug-in connection element and the negative connection element can be designed as a female plug-in connection element, or vice versa. In a particularly preferred refinement, the positive connection element, which is designed as a plug-in connection element, and the negative connection element, which is designed as a plug-in connection element, form a plug-in connection in the sense of a trapezoidal slide guide or else, for example, in the sense of a trapezoidal dovetail guide. It has been found to be advantageous when a plug-in direction of the plug-in connection elements is oriented parallel in relation to the cell top side and in relation to the cell bottom side. A plug-in connection between the positive connection element and the negative connection element can be of reversible and also irreversible design. For an irreversible configuration, one plug-in connection element or both plug-in connection elements can have, for example, barbs.

In a further preferred refinement, the positive connection element and/or the negative connection element are each designed as screw-connection elements. Preferably, screw-connection elements of this kind are preferably complementary. Individual pouch cells of a stack can be screwed to one another or into one another by means of the screw-connection elements. A contact-connection of this kind can also be of reversible or irreversible configuration.

It has been found to be advantageous when the screw-connection element or elements are electrically conductive only in sections in such a way that electrical contact is made only after mechanical contact is made or at the end of a mechanical contact-connection operation. In other words, provision can be made for an electrical contact-connection to be made, by cells which are to be screwed into one another or to one another, only when the cells are completely screwed to one another or into one another. This has the advantage that short circuits due to incorrect contact-connections in a mass production process can, in principle, be precluded or else at least considerably reduced.

It has been found to be advantageous when the pouch cell is electrically insulated outside the positive contact region and/or outside the negative contact region. In a particularly preferred refinement, the cell top side and/or the cell bottom side are of substantially flat design. A cell thickness is preferably lower than a cell width and/or a cell depth.

It has been found to be advantageous when the connection elements each extend perpendicularly in relation to the flat cell top side and/or perpendicularly in relation to the flat cell bottom side. The connection elements can protrude beyond the flat cell top side and/or the flat cell bottom side. In a particularly preferred refinement, the positive contact region and the negative contact region are routed out of the pouch cell by means of loops or electrical lines which run within the pouch cell.

In all of the exemplary embodiments described here, the positive contact region and/or the negative contact region can be of metal design for example. The positive contact region and/or the negative contact region can consist of aluminum or contain aluminum. The negative contact region is preferably designed as a metal negative pole. A metal negative pole can, for example, consist of nickel or contain nickel. As an alternative or in addition, a configuration of this kind is possible for the positive contact region.

The invention also provides a stack comprising a plurality of pouch cells of the kind described above, wherein the pouch cells are electrically contact-connected to one another by means of their respective connection elements. A contact-connection of this kind is preferably a series circuit, wherein a positive contact region of a first pouch cell is electrically contact-connected to a negative contact region of an adjacent pouch cell. A stack of this kind can be developed in a corresponding manner by the features which are described above with respect to the pouch cell.

The invention likewise relates to the use of a stack of the kind described above for supplying power to an electrical handheld power tool, wherein the stack is preferably arranged in a rechargeable battery pack of the electrical handheld power tool.

Further advantages will become apparent from the following description of the figures. The figures illustrate various exemplary embodiments of the present invention. The figures, the description and the claims contain numerous features in combination. A person skilled in the art will expediently also consider the features individually and combine them to produce further useful combinations.

BRIEF DESCRIPTION OF THE DRAWINGS

In the figures, identical and similar components are denoted by the same reference signs. In the figures:

FIG. 1 shows a pouch cell of the prior art;

FIGS. 2A and 2B shows a first preferred exemplary embodiment of a pouch cell according to the invention;

FIGS. 4A and 4B shows plug-in connection elements of a second preferred exemplary embodiment of a pouch cell according to the invention;

FIGS. 7A and 7B shows a perspective illustration of the exemplary embodiment of FIGS. 6A and 6B; and FIGS. 8A and 8B shows a fourth preferred exemplary embodiment of a pouch cell according to the invention.

DETAILED DESCRIPTION

Figure 3B:
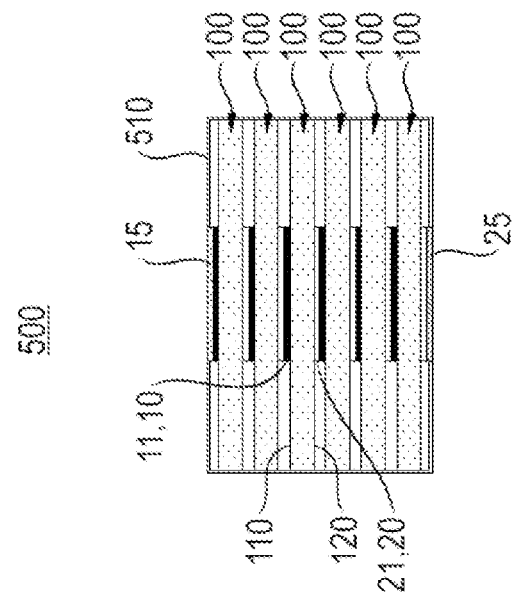
FIGS. 3A and 3B shows a preferred exemplary embodiment of a stack according to the invention.

A pouch cell 100S of the prior art is illustrated in FIG. 1. The pouch cell 100S has a positive contact region 10 and a negative contact region 20, by means of which contact regions electrical contact can be made with the pouch cell 100S and said pouch cell can be charged and discharged in this way. The pouch cell 100S is of planar design and has a cell top side 110 and a cell bottom side, not shown here, which is situated opposite the cell top side 110.

As can be gathered from FIG. 1, the positive contact region 10S and the negative contact region 20S are each designed as a contact lug, which contact lugs project from the pouch cell 100S in the lateral direction SR. Here, the pouch cell 100S has an encircling cell edge strip 130 on which the positive contact region 10S and the negative contact region 20S are located at least on one side.

The pouch cell 100S shown in FIG. 1 has the disadvantage already mentioned above that it is comparatively difficult to handle in a mass production process on account of the contact lugs (positive contact region 10S and negative contact region 20S) being situated comparatively close to one another since—if not carefully handled—there is a risk of the pouch cell 100S short-circuiting.

In contrast to the pouch cell 100S of the prior art, FIGS. 2A and 2B now shows a pouch cell 100 according to the invention. Here, FIG. 2A shows the top side and FIG. 2B shows the bottom side of the pouch cell.

The pouch cell 100 of FIGS. 2A and 2B has a positive contact region 10 and a negative contact region 20, by means of which contact regions electrical contact can be made with the pouch cell 100 and said pouch cell can be charged and discharged in this way. The pouch cell 100 is of planar design and has a cell top side 110 (FIG. 2A). The pouch cell 100 likewise has a cell bottom side 120 (FIG. 2B) which is situated opposite the cell top side 110.

According to the invention, provision is made for the positive contact region 10 to be located exclusively on the cell top side 110 and the negative contact region 20 to be located exclusively on the cell bottom side 120.

In the first preferred exemplary embodiment of FIGS. 2A and 2B, it can be clearly seen that an encircling cell edge strip 130 is free of any electrical contact-making elements.

In the exemplary embodiment of FIGS. 2A and 2B, the positive contact region 10 is designed as an electrical positive connection element 11 and the negative contact region 20 is designed as an electrical negative connection element 21. In this case, the positive connection element 11 and the negative connection element 21 are each of flat design and, here, of square design by way of example. The positive connection element 11 and the negative connection element 21 serve for making contact with the pouch cell 100 by means of pressing.

Figure 3A:
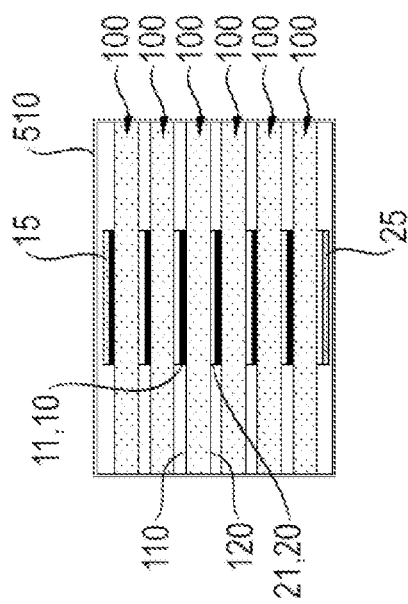

A stack 500, which has a plurality of pressed pouch cells 100, is illustrated in FIGS. 3A and 3B. FIGS. 3A and B show various variant refinements of a stack 500 within a housing 510.

The two FIGS. 3A and B share the common feature that a plurality of layered pouch cells 100 are provided, here six layered pouch cells 100 by way of example. Each of the pouch cells 100 has a cell top side 110 with a positive contact region 10 arranged on it and a cell bottom side 120 with a negative contact region 20 arranged on it. In this case, the positive connection region 10 of a first pouch cell 100 is connected to the negative contact region 20 of an adjacent pouch cell. In other words, the pouch cell stacks 500 are series circuits of pouch cells 100.

It can also be clearly seen in FIGS. 3A and 3B that the respective pouch cells 100 are electrically contact-connected only on their cell top side 110 or cell bottom side 120.

The topmost pouch cell 100 in the stack additionally has a positive stack connection 15. A negative stack connection 25 is provided on the lowermost pouch cell 100 in the stack. The stack 500 is electrically incorporated, for example, into a rechargeable battery pack, not illustrated more precisely here, for an electrical handheld power tool by means of the positive stack connection 15 and the negative stack connection 25. The differences between the exemplary embodiments of FIGS. 3A and B will be briefly discussed in the text which follows. FIG. 3A shows a housing 510 in a closed variant, that is to say the positive stack connection 15 and the negative stack connection 25 are not part of a surface of the housing 510. The positive stack connection 15 and, respectively, the negative stack connection 25 are electrically contact-connected to the surrounding area by electrical connection lines, not illustrated further here.

In contrast, FIG. 3B shows the stack 500 in an open variant of the housing 510, that is to say the positive stack connection 15 and the negative stack connection 25 form part of the surface of the housing 510.

The housing 510 of FIGS. 3A and 3B can be of cuboidal design, but is preferably designed in the form of a cube.

Figure 5:
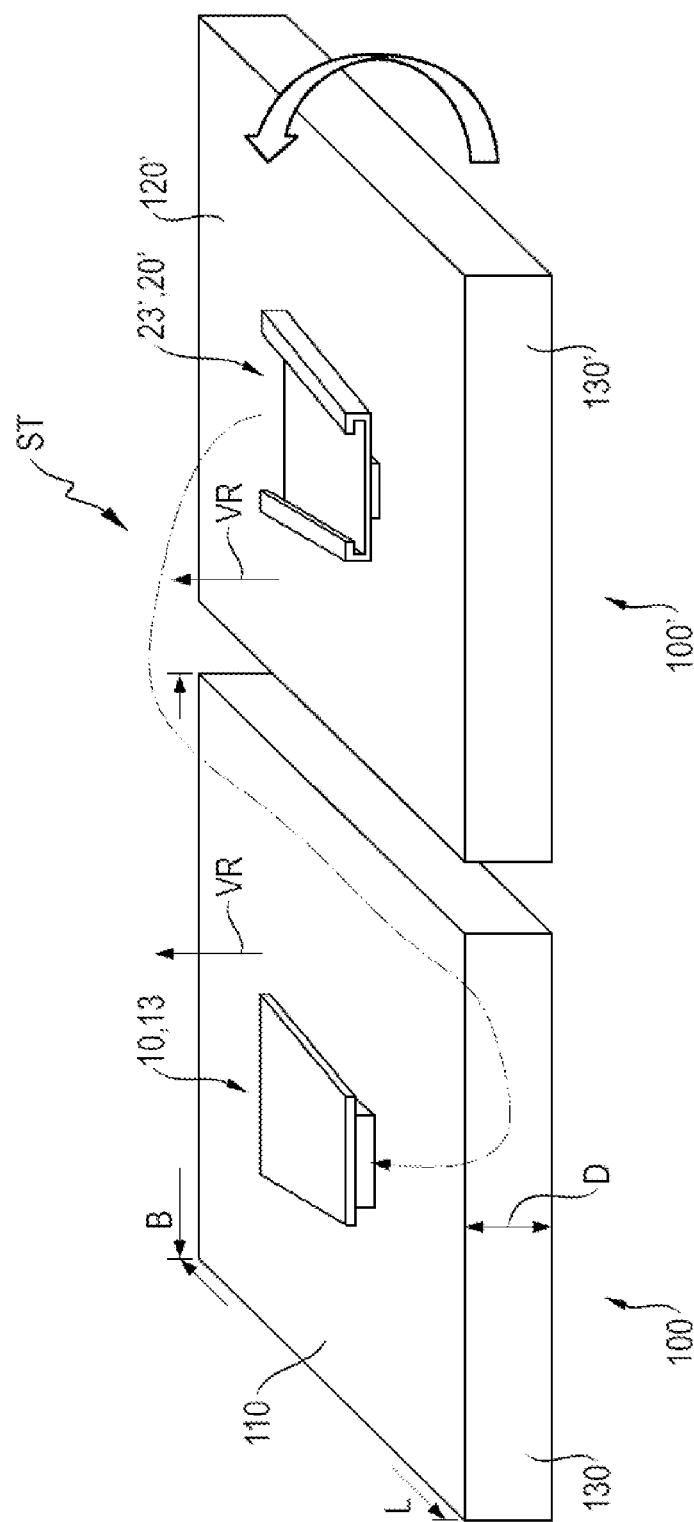
FIG. 5 shows two pouch cells of the second preferred exemplary embodiment in their entirety.

FIGS. 4A and 4B shows details of a second preferred exemplary embodiment of a pouch cell 100 according to the invention (cf. FIG. 5 too).

In FIGS. 4A and 4B, the positive contact region 10 is designed as a combined electrical/mechanical positive plug-in connection element. The negative contact region 20 is designed as a combined electrical/mechanical negative plug-in connection element. As can be gathered from FIGS. 4A and 4B overall, the plug-in connection elements 13, 23 are complementary and here form a plug-in connection in the sense of a trapezoidal or wedge-like connection in the manner of a slide guide.

FIG. 4A shows the positive contact region 10 in detail, wherein a plan view is illustrated in the upper part of FIG. 4A and a section in accordance with section line A-A is illustrated in the lower part of FIG. 4A. It can be clearly seen that the cell top side 110 is substantially flat and the positive plug-in connection element 13 projects over the flat cell top side 110 in the vertical direction VR.

It can once again be clearly seen in FIG. 4B that the negative plug-in connection element 23 also protrudes beyond a flat cell bottom side 120, indicated here, in the vertical direction VR. It should once again be noted at this point that several options are conceivable for a configuration of the connection elements as plug-in connection elements, wherein FIG. 4 illustrates a preferred refinement in any case.

FIGS. 5A and 5B shows two pouch cells 100, 100' according to the second preferred exemplary embodiment of FIGS. 4A and 4B before they are plugged together. Therefore, the pouch cells 100, 100' are two pouch cells which would be adjacent to one another in a stack, not shown here.

The two pouch cells 100, 100' of FIGS. 5A and 5B are of identical design, wherein, in the pouch cell 100 on the left-hand side of FIGS. 5A and 5B, the cell top side 110 is situated at the top, whereas, on the right-hand side of FIGS. 5A and 5B, a cell bottom side 120' of the second pouch cell 100' is illustrated at the top by way of example.

As can be clearly gathered from FIGS. 5A and 5B on account of the perspective illustration, the positive plug-in connection element 13 of the first pouch cell 100 and the negative plug-in connection element 23' of the second pouch cell 100' are designed in a complementary manner in relation to one another. During the course of plugging together the two pouch cells 100, 100'—this is indicated by the dashed lie—the positive plug-in connection element 13 is mechanically closed by the negative plug-in connection element 23'. At the same time, an electrical contact-connection of the two pouch cells is realized by this mechanical closing. In this case, a plugging-together operation takes place in the plug-in direction ST parallel in relation to the cell top side 110 and in relation to the cell bottom side 120'.

As can likewise be seen in figure, a thickness D of the pouch cell 100 is lower than the width B and the length L of the pouch cell. In the exemplary embodiment illustrated at present, the thickness D is lower than one fifth of the width B and of the length L.

Figure 6B:
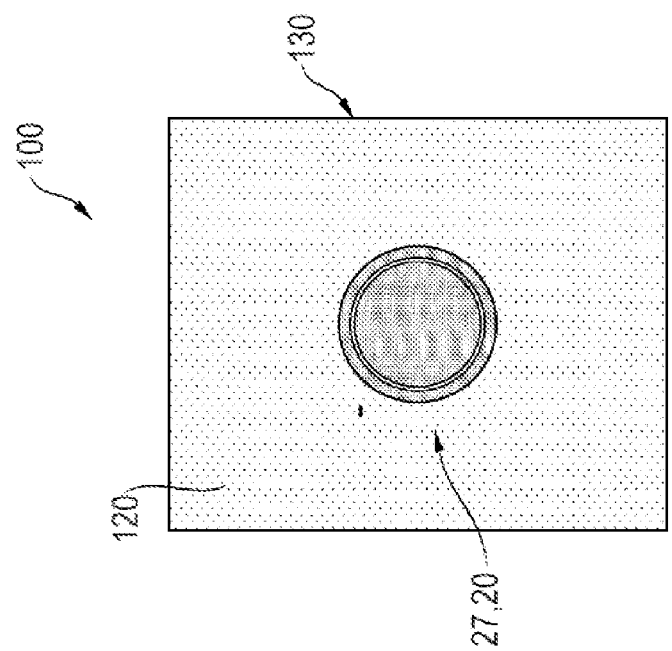
FIGS. 6A and 6B shows a plan view of a third preferred exemplary embodiment of a pouch cell according to the invention.
Figure 6A:
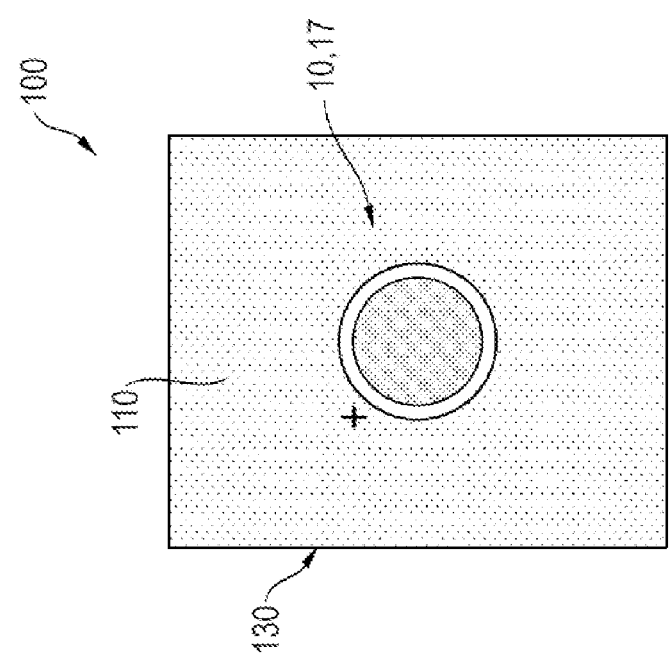

FIGS. 6A and 6B shows a plan view (FIG. 6A) and a bottom view (FIG. 6B) of a third preferred exemplary embodiment of a pouch cell 100 according to the invention. In the exemplary embodiment of FIGS. 6A and 6B, the positive contact region 10 is designed as a positive screw-connection element 17. The negative contact region 20 is designed as a negative screw-connection element 27. The positive screw-connection element 17 negative screw-connection element 27 are complementary, as can be seen in the perspective side view of FIGS. 7A and 7B. As can be seen in FIG. 7A, the positive screw-connection element 17 is designed as a male connection element. The negative screw-connection element 27 (FIG. 7B) is designed as a female screw-connection element. In both views, it can be clearly seen that the cell top side 110 and the cell bottom side 120 are substantially flat and an encircling cell edge strip 130 is free of any electrical contact-making elements.

The positive screw-connection element 17 and the negative screw-connection element 27 are complementary in relation to one another. In other words, the positive screw-connection element 17 in the form of a screw can be screwed into the negative screw-connection element 27 (in the form of a nut). It goes without saying that this applies to different cells of the same construction since FIGS. 7A and 7B shows, by way of example here, the top side and the bottom side of one and the same pouch cell 100.

It can likewise be clearly seen in FIGS. 7A and 7B that the positive plug-in connection element 13 protrudes beyond the flat cell top side 110 in the vertical direction VR. The negative screw-connection element 27 protrudes beyond the cell bottom side 120 in the vertical direction VR. The pouch cell 100 is electrically insulated outside the positive contact region 10 and outside the negative contact region 20. This is advantageously a preferred development in all other exemplary embodiments too.

Finally, FIGS. 8A and 8B shows a fourth preferred exemplary embodiment of a pouch cell according to the invention. The pouch cell 100 has a positive contact region 10 on a cell top side 110 and a negative contact region 20 on an opposite cell bottom side 120. The positive contact region 10 is arranged exclusively on the cell top side 110 and the negative contact region 20 is arranged exclusively on the cell bottom side 120.

The positive contact region 10 is designed as a male positive screw-connection element 17 and the negative contact region 20 is designed as a female negative screw-connection element 27.

In contrast to the exemplary embodiment described with respect to FIGS. 7A and 7B, the negative screw-connection element 27 extends beyond the cell bottom side 120 in the vertical direction VR only in sections. Like the positive screw-connection element 17, the negative screw-connection element 27 is also an electrical/mechanical connection element, that is to say the screw-connection elements 17, 27 render possible both electrical contact-connection and also mechanical connection of pouch cells to one another.

In contrast to the exemplary embodiment described with respect to FIGS. 7A and 7B, the negative screw element 27 is of two-part design in the exemplary embodiment of FIGS. 8A and 8B, that is to say said negative screw element has a purely mechanical region 27M and an electrical region 27E. Therefore, the negative screw-connection element 27 is electrically conductive only in regions, specifically in the region 27E, and therefore electrical contact is made only when the positive screw-connection element 17 is completely screwed into the negative screw-connection element 27. In this case, electrical contact is made by means of the electrical region 27E. The variant shown in FIGS. 8A and 8B has the advantage of further increased security against short circuits for a mass production process of pouch cell stacks.

In a particularly preferred refinement and shown schematically in FIGS. 8A and 8B, the positive contact region 10 and the negative contact region 20 are routed out of the pouch cell 100 by means of loops or electrical lines 1000, 1001 which run within the pouch cell 100.

LIST OF REFERENCE SIGNS

10 Positive contact region
11 Positive connection element
13 Positive plug-in connection element
15 Positive stack connection
17 Positive screw-connection element
20 Negative contact region
21 Negative connection element
23 Negative plug-in connection element
25 Negative stack connection
27 Negative screw-connection element
27M Mechanical region
27E Electrical region
100 Pouch cell
110 Cell top side
120 Cell bottom side
130 Cell edge strip
500 Stack
510 Housing
1000, 1001 Loops or electrical lines
B Width
D Thickness
L Length
PR Parallel direction
SR Lateral direction
ST Plug-in direction
VR Vertical direction

The invention claimed is:

1. A pouch cell comprising:
a positive contact region; and
a negative contact region;
electrical contact with, and charging and discharging of, the pouch cell being possible via the positive and negative contact regions;
the pouch cell being of planar design and having a cell top side and a cell bottom side situated opposite the cell top side;
the positive contact region being located exclusively on the cell top side and the negative contact region being located exclusively on the cell bottom side, or vice versa,
wherein the cell top side and cell bottom side are each planar and have a larger surface area than any other sides of the pouch cell.

2. The pouch cell as recited in claim 1 wherein the pouch cell has an encircling cell edge strip free of electrical contact lugs or free of any kind of electrical contact-making elements.

3. The pouch cell as recited in claim 1 wherein the positive contact region is designed as an electrical or mechanical positive connection element and the negative contact region is designed as an electrical or mechanical negative connection element.

4. The pouch cell as recited in claim 3 wherein the positive connection element and the negative connection element are each of flat design and designed for contact-connection via pressing or welding.

5. The pouch cell as recited in claim 3 wherein the positive connection element and the negative connection element are each designed as a plug-in connection element.

6. The pouch cell as recited in claim 5 wherein the positive connection element and the negative connection element are complementary.

7. The pouch cell as recited in claim 5 wherein a plug-in direction of the plug-in connection elements is oriented parallel in relation to the cell top side and in relation to the cell bottom side.

8. The pouch cell as recited in claim 3 wherein the positive connection element and the negative connection element are each designed as screw-connection elements.

9. The pouch cell as recited in claim 8 wherein the positive connection element and the negative connection element are complementary.

10. The pouch cell as recited in claim 8 wherein the screw-connection elements are electrically conductive only in sections in such a way that electrical contact is made only after mechanical contact is made.

11. The pouch cell as recited in claim 3 wherein the pouch cell is electrically insulated outside the positive contact region and the negative contact region.

12. The pouch cell as recited in claim 1 wherein the cell top side and the cell bottom side are flat.

13. The pouch cell as recited in claim 3 wherein the cell top side and the cell bottom side are flat and wherein the positive and negative connection elements each extend perpendicularly in relation to the flat cell top side or the cell bottom side.

14. The pouch cell as recited in claim 3 wherein the cell top side and the cell bottom side are flat and wherein the negative and positive connection elements protrude beyond the flat cell top side or the flat cell bottom side.

15. The pouch cell as recited in claim 1 wherein the positive contact region and the negative contact region are routed out of the pouch cell via loops or lines running within the pouch cell.

16. A stack having a plurality of pouch cells each as recited in claim 1, wherein the pouch cells are electrically contact-connected to one another via respective connection elements.

17. A method for operating am electrical handheld power tool comprising: supplying power to an electrical handheld power tool using the stack as recited in claim 16.

18. The pouch cell as recited in claim 1 wherein the cell top side and cell bottom side are each planar and have a larger surface area than the cell edge strip.

19. The pouch cell as recited in claim 3 wherein both the positive and negative connection elements protrude outwardly beyond the top cell side and the bottom cell side.

20. The pouch cell as recited in claim 1 wherein the positive contact region is attached to a flat surface of the cell top side and the negative contact region is attached to a further flat surface of the cell bottom side, or vice versa.

\* \* \* \* \*